(12) United States Patent
Peng

(10) Patent No.: US 10,632,721 B2
(45) Date of Patent: Apr. 28, 2020

(54) CONNECTION STRUCTURE OF PURE WOOD MATERIALS

(71) Applicant: Zhijun Peng, Guangdong (CN)

(72) Inventor: Zhijun Peng, Guangdong (CN)

( * ) Notice: Subject to any disclaimer, the term of this patent is extended or adjusted under 35 U.S.C. 154(b) by 400 days.

(21) Appl. No.: 15/628,654

(22) Filed: Jun. 21, 2017

(65) Prior Publication Data

US 2018/0370187 A1 Dec. 27, 2018

(51) Int. Cl.
| | |
|---|---|
| *B32B 9/04* | (2006.01) |
| *B32B 21/14* | (2006.01) |
| *B32B 3/06* | (2006.01) |
| *B32B 7/08* | (2019.01) |
| *E04C 2/32* | (2006.01) |
| *B32B 21/13* | (2006.01) |
| *E04C 2/12* | (2006.01) |
| *B32B 7/12* | (2006.01) |
| *E04C 1/00* | (2006.01) |
| *E04B 2/02* | (2006.01) |

(52) U.S. Cl.
CPC .............. *B32B 9/042* (2013.01); *B32B 3/06* (2013.01); *B32B 7/08* (2013.01); *B32B 21/13* (2013.01); *B32B 21/14* (2013.01); *E04C 2/12* (2013.01); *E04C 2/328* (2013.01); *B32B 7/12* (2013.01); *E04B 2002/0265* (2013.01); *E04C 1/00* (2013.01)

(58) Field of Classification Search
CPC ..... E04C 2/10; E04C 2/12; E04C 2/18; E04C 2/386; E04C 3/292; E04C 1/00; B32B 9/042; B32B 3/06; B32B 7/08; B32B 21/14; B32B 7/12

USPC ........ 144/346, 353; 52/223.1, 223.4–223.12; 428/223
See application file for complete search history.

(56) References Cited

U.S. PATENT DOCUMENTS

| | | | | |
|---|---|---|---|---|
| 4,506,648 | A * | 3/1985 | Roberts | F04B 49/02 123/564 |
| 5,163,259 | A * | 11/1992 | Hunsaker | E04B 2/704 52/233 |
| 5,400,845 | A * | 3/1995 | Choiniere | E04B 2/703 144/329 |
| 6,588,161 | B2 * | 7/2003 | Smith | E04B 2/702 52/223.7 |
| 7,137,226 | B2 * | 11/2006 | Fiutak | B27M 3/0053 52/223.7 |
| 7,823,351 | B2 * | 11/2010 | Tiberi | B29C 44/1233 52/233 |
| 8,906,480 | B2 * | 12/2014 | Fiutak | E01C 9/086 428/54 |
| 9,382,718 | B1 * | 7/2016 | Li | E04F 15/02038 |

(Continued)

*Primary Examiner* — William V Gilbert

(57) ABSTRACT

A pure wood connection structure, having pure wood units, self tapping screws, a first pure wood edge sealing unit and a second pure wood edge sealing unit; an upper side and a lower side of each pure wood unit are provided respectively with a contraction slit, and are applied with wood adhesives; in each pure wood unit, the self tapping screws are screwed into the pure wood unit from the contraction slit on the upper side, through the contraction slit on the lower side, and down into the upper side of an adjacent pure wood unit, so that the upper side of each pure wood unit is connected with the lower side of a corresponding adjacent pure wood unit; all the pure wood units are likewise mutually connected one adjacent to another to form a board structure.

6 Claims, 12 Drawing Sheets

(56) References Cited

U.S. PATENT DOCUMENTS 10,189,177 B2 * 1/2019 Bosson .................. B27M 3/006
2009/0324876 A1 * 12/2009 Yang ....................... B27D 1/04
428/99

* cited by examiner

CONNECTION STRUCTURE OF PURE WOOD MATERIALS

BACKGROUND OF THE INVENTION

The present invention relates to the technical field of wooden board material, and more specifically relates to a board structure formed by connecting wooden strips made of pure wood.

US20170036422 filed by the same inventor on Aug. 6, 2015 discloses a "Pure wooden laminated board and an aluminium-wood composite laminated board device with application of the pure wooden laminated board" having substantially the following features: The pure wooden laminated board is formed by connecting and gluing several small solid wooden boards. Holes are provided for bolts to pass through between the small solid wooden boards, and then nuts are used to fasten the other ends of the bolts. This prior art mainly consists of the following disadvantage: the use of bolts for penetration, fastening and connection can only allow wooden boards to be straightly connected. However, this kind of method does not work if wooden boards have to be connected to form a laminated board having a curved shape, an arc shape, or having a 3D shape with curved surfaces or having continuously changing curved surfaces, or when the laminated board is small or thin. The reason is that the tensional force of the bolts connecting the wooden boards is straightly oriented The tensional force cannot bend. Even if the bolts are processed to form a bend according to a predetermined bend of the laminated board, straightening will still occur when the bolts are tensioned. Therefore, this kind of method is only suitable for manufacturing laminated board that is straightly connected, but not suitable to form laminated board which has curves or arcs. Besides, mounting of bolts is difficult and complicated. After deep researches and studies, the inventor has arrived to this better invention.

BRIEF SUMMARY OF THE INVENTION

In view of the aforesaid disadvantages now present in the prior art, the present invention provides a connection structure of pure wood materials. The connection structure disclosed in the present invention is more reasonable and inventive and is very suitable for making a board structure which is small and thin and which possesses a curve shape, an arc shape, or having a 3D shape with curves or having continuously changing curved surfaces. Also, the present invention does not require the use of large and old pieces of wood, and thus increasing the usability of small wooden materials, and in turns developing a new, environmentally friendly and sustainable way of producing pure wood products. Further, the board structure formed by connecting pure wood materials according to the present invention has several advantages such as easy assembly, firm and reliable structure, resistant to cracks and deformation, and prolonged service life.

The present invention is achieved according to the following embodiments: A board structure formed by connecting pure wood materials, comprising several pure wood units, several self tapping screws, a first pure wood edge sealing unit and a second pure wood edge sealing unit; an upper side and a lower side of each of the pure wood units are provided respectively with a contraction slit; the upper side and the lower side respectively possessed with the contraction slit are applied with wood adhesives; in each one of the pure wood units, several self tapping screws are screwed into the pure wood unit from the contraction slit on the upper side, through the contraction slit on the lower side, and down into the upper side of a corresponding adjacent pure wood unit of the pure wood units, so that the upper side of one pure wood unit is connected with the lower side of a corresponding adjacent pure wood unit; all the pure wood units are likewise mutually connected one adjacent to another to form a board structure. The wood adhesives are also applied to the first pure wood edge sealing unit and the second pure wood edge sealing unit; the first pure wood edge sealing unit and the second pure wood edge sealing unit are connected respectively to an upper outermost side and a lower outermost side of the board structure; and then a clamp designed for wood work is used for clamping and pressing the board structure.

On the basis of the above disclosure, in order to make pure wood products having arc shapes, continuous changing curved surfaces or 3D shapes having curved surfaces, the pure wood units are processed to have arc shapes; engagement teeth are arranged in a left side and a right side of each of the pure wood units; wood adhesives are applied to each of the engagement teeth; the engagement teeth on the left side of a pure wood unit are engaged with the engagement teeth on the right side of a corresponding adjacent pure wood unit; each of the pure wood units 1 is likewise having the left side thereof connected with the right side of a corresponding adjacent pure wood unit.

On the basis of the above disclosure, in order that four sides of the board structure being formed are flatter and smoother, so that the board structure will no longer bulge and deform so as to completely avoid cracking and deformation to achieve greater stability and structural strength of the entire board structure, a pure wood frame is also provided; insertion edges are provided on four sides of the board structure; insertion slots are corresponding provided on four inner sides of the pure wood frame; the insertion edges of the board structure are inserted into the insertion slots of the pure wood frame, so that the board structure is assembled in the pure wood frame. The four sides of the board structure are limited by the pure wood frame, so that the four sides of the board structure will no longer bulge and deform. Accordingly, the board structure is completely prevented from cracks and deformation. The entire board structure is more stable and has better structural strength. Besides, the properties of solid pure wood are completely preserved in the entire board structure. Consumers' demands for solid pure wood products are effectively satisfied.

On the basis of the above disclosure, in order to provide a board structure having electric heating function, two pieces of board structure are used; an electric heating element is provided between the two pieces of board structure; the electric heating element mounted between the two pieces of board structure achieves the heating function; the two pieces of board structure have the advantages of stable and strong structure and are resistant to cracking and deformation by virtue of the earlier described technical scheme. More importantly, the entire electrically heated pure wood board structure is ensured to be made completely by solid pure wood; the electric heating element is completely free of any metal parts and will not be visible from the outer appearance of the board structure. Light weight and low cost also facilitate processing and shaping into different specifications to be applied to different solid pore wood products. The adaptability and shaping of the board structure have no difference compared with conventional solid pure wood boards. However, the present invention has a wider applicability and effectively overcomes the problems of a conventional solid pure wood board such as easy deformation and cracking.

The present invention has the following beneficial advantages: (1) The present invention has a more reasonable and inventive structure and is very suitable for making a board structure which is small and thin and which possesses a curve shape, an arc shape, or having a 3D shape with curves or having continuously changing curved surfaces. Also, the present invention does not require the use of large and old pieces of wood, and thus increasing the usability of small wooden materials, and in turns developing a new, environmentally friendly and sustainable way of producing pure wood products. Further, the board structure formed by connecting pure wood materials according to the present invention has several advantages such as easy assembly, firm and reliable structure, and is resistant to cracks and deformation, and has a prolonged service life. (2) The present invention is not limited by the exact shape and degree of the curve or arc. Units having any shape and degree of curve or arc can be connected, and be processed and made into a product or a workpiece having curves or arcs. This advantage is particularly pronounced. (3) A contacting surface in each of two adjacent pure wood units connecting to each other is provided with a contraction slit. The contraction slit can effectively prevent bulging and deformation due to expansion or cracking due to contraction caused by climatic changes. The quality and outer appearance of the board structure are maintained and upheld, and the service life of the board structure is prolonged. Besides, the board structure remains flat and smooth and its outer appearance and use will not be affected because the contraction slits are hidden in the pure wood units and are not visible from outside. (4) The screws are hidden in the pure wood units. Therefore, the screws are not visible from outer surfaces of the board structure formed after connection of the pure wood units. The visible outer surfaces are just flat and smooth wood materials. As such, the board structure has a better outer appearance, and the screws can be prevented from contacting air or exposed to moisture which may corrode the screws. Hence, the service life of the board structure is prolonged. (5) plurality of self tapping screws arranged in a staggered manner in the pure wood units for fixation ensure that cracks will not develop on the board structure so that a perfectly integral crack-less board structure is ensured. Also, the contraction slits between the pure wood units offset the expansion and contraction of the board structure during climatic changes, so that the board structure is ensured not to form any crack and thus maintain a flawless surface throughout the year. The use of self tapping screws are better than bolts because the screw threads of the self tapping screws can already engage tightly with wood materials so that the wood materials cannot expand or contract arbitrarily. As such, the possibility of wood expansion or contraction is reduced, so that the board structure is more stable than when bolts are being used. Bolts can only tighten and lock all the wood materials as a whole. When the wood materials contract due to the loss of water inside, the bolts cannot automatically achieve tightening and locking following the contraction of the wood materials, and as a result, cracks will be developed between wood materials. (6) The present invention can effectively replace the use of medium density fiber board, chipboard, laminated board, large core board, finger joint board, plastic board, Australian pine board, and eco board; the present invention is also natural and environmental friendly, and can be widely used in furniture industry, construction industry, kitchens and bathrooms, wooden houses, house decoration industry, integrated home solution industry and any other industries that may require the use of wood materials. Also, the pure wood board structure can be effectively used with aluminum, steel or non-metal materials in order to make pure wood composite material as desired and necessary.

DETAILED DESCRIPTION OF THE INVENTION

Figure 1:
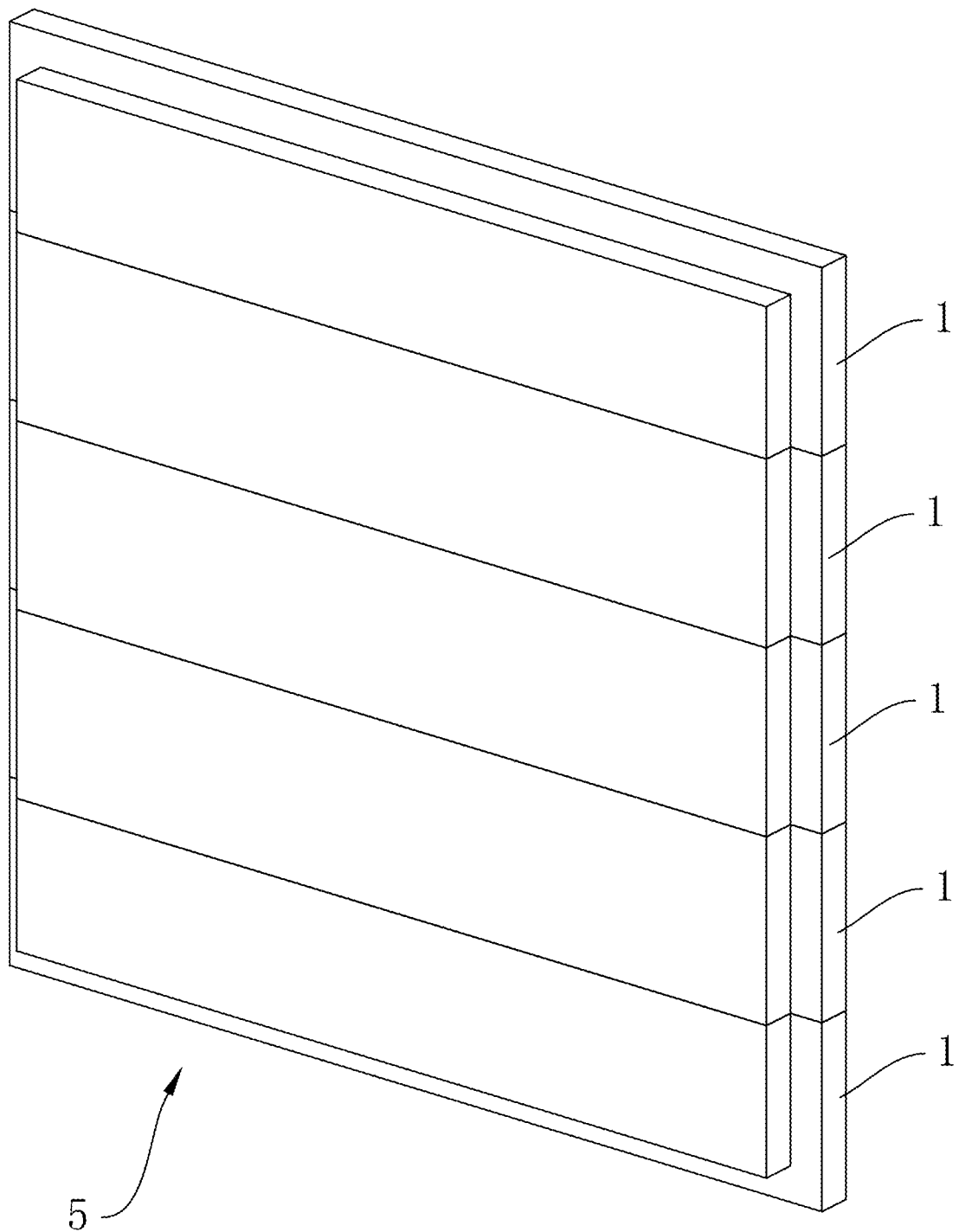
FIG. 1 is a perspective structural view of the present invention.
Figure 2:
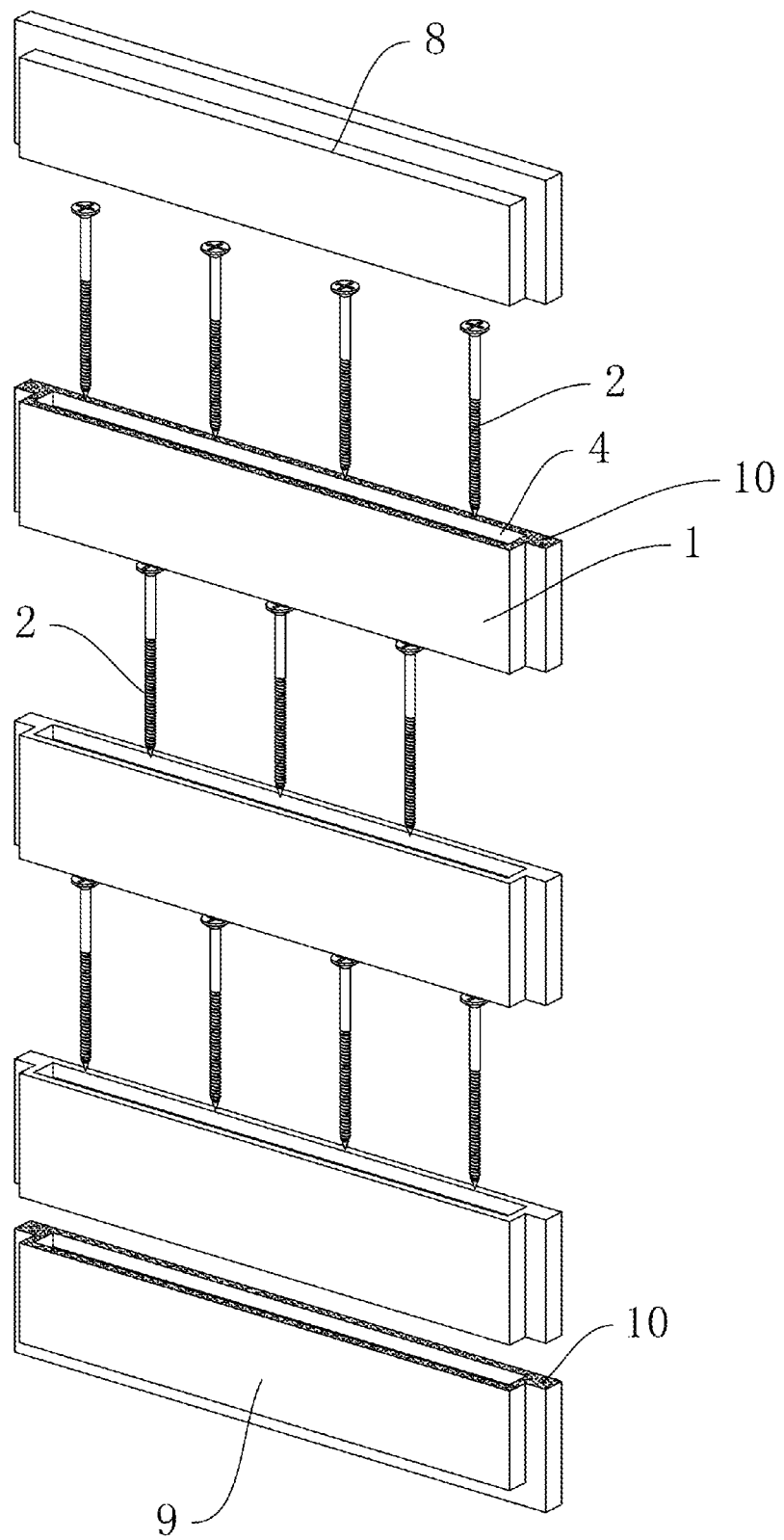
FIG. 2 is an exploded structural view of the present invention.
Figure 3:
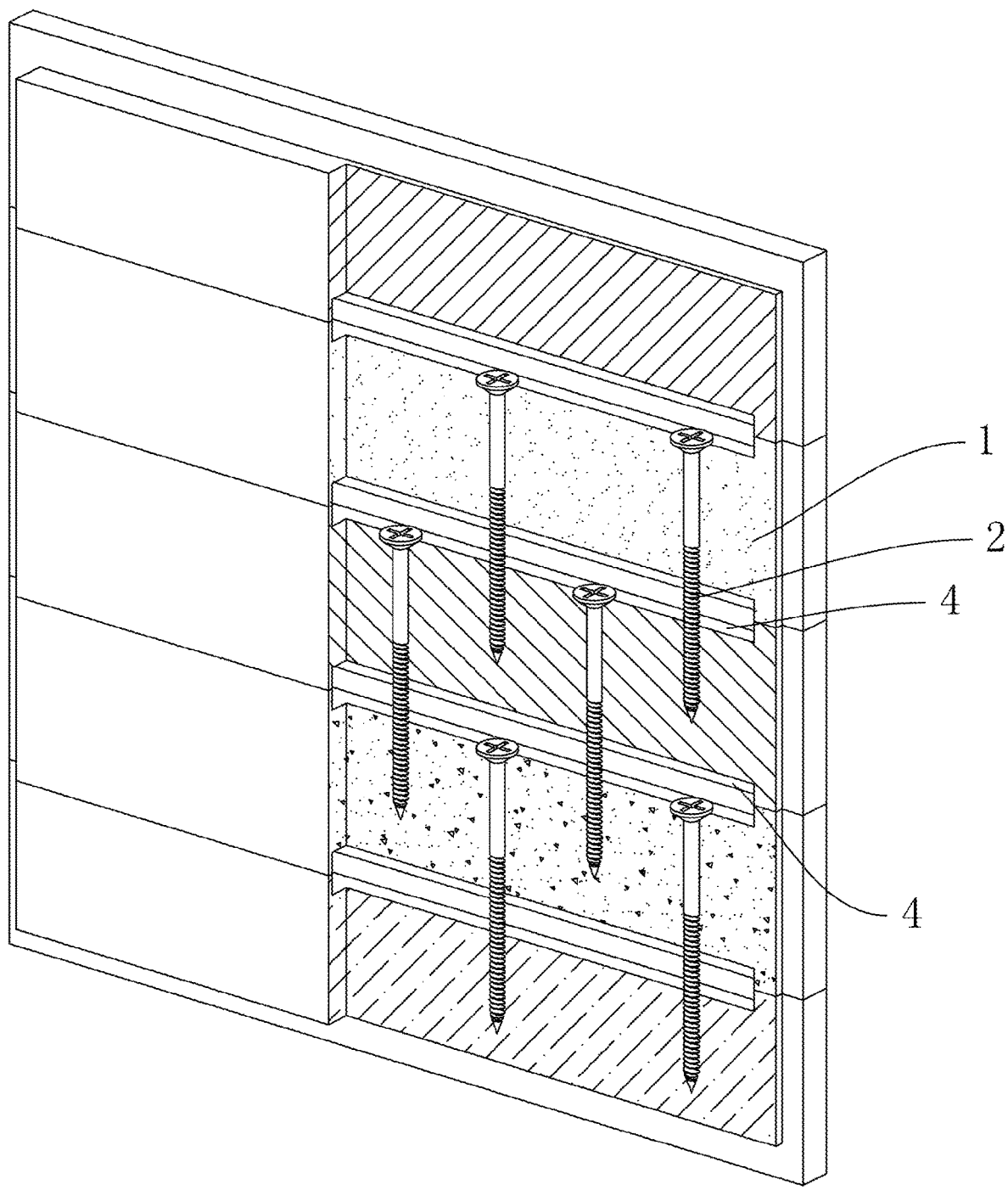
FIG. 3 is a partially sectioned perspective view of the present invention.

As shown in FIGS. 1-3, the present invention is a board structure formed by connecting pure wood materials, comprising several pure wood units 1, several self tapping screws 2, a first pure wood edge sealing unit 8 and a second pure wood edge sealing unit 9.

An upper side and a lower side of each of the pure wood units 1 are provided respectively with a contraction slit 4. The contraction slit 4 allows the pure wood materials to be tensile when the pure wood materials expands or contracts under dry condition, so as to present the pure wood materials from cracking, bulging and deforming. The upper side and the lower side respectively possessed with the contraction slit 4 are applied with wood adhesives 10. Wood adhesives 10 bind the pure wood units 1 more tightly and firmly when they are connected. The wood adhesives 10 are applied prior to connection of the pure wood units 1.

As shown in FIGS. 2-3, in each one of the pure wood units 1, several self tapping screws 2 are screwed into the pure wood unit from the contraction slit 4 on the upper side, through the contraction slit 4 on the lower side, and down into the upper side of a corresponding adjacent pure wood unit of the pure wood units 1, so that the upper side of one pure wood unit is connected with the lower side of a corresponding adjacent pure wood unit; all the pure wood units 1 are likewise mutually connected one adjacent to another to form a board structure 5 as shown in FIG. 3.

The wood adhesives 10 are also applied to the first pure wood edge sealing unit 8 and the second pure wood edge sealing unit 9; the first pure wood edge sealing unit 8 and the second pure wood edge sealing unit 9 are connected respectively to an upper outermost side and a lower outermost side of the board structure 5; and then a clamp designed for wood work is used for clamping and pressing the board structure 5 to achieve an effect shown in FIG. 1. During connection, the self tapping screws 2 arranged in any one of the pure wood units 1 are staggered with respective to the self tapping screws 2 arranged in a corresponding adjacent pure wood unit thereof, so that the self tapping screws 2 arranged in different pure wood units Twill not collide together affecting the connection between the pure wood units 1.

Figure 4:
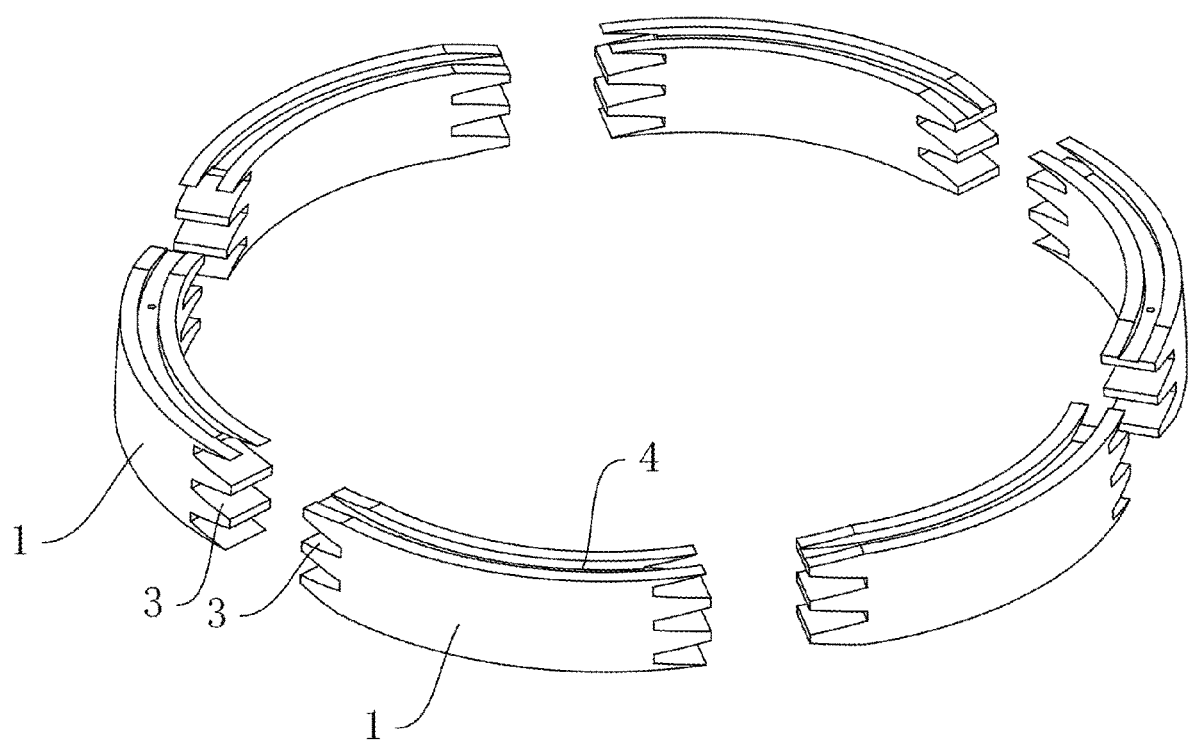
FIG. 4 is an exploded structural view of a first variation of the present invention.

On the basis of the above disclosure and according to the practical need in different circumstances, the pure wood units 1 can be processed to have arc shapes as shown in FIG. 4; also engagement teeth 3 are arranged in a left side and a right side of each of the pure wood units 1; wood adhesives are applied to each of the engagement teeth 3.

Figure 5:
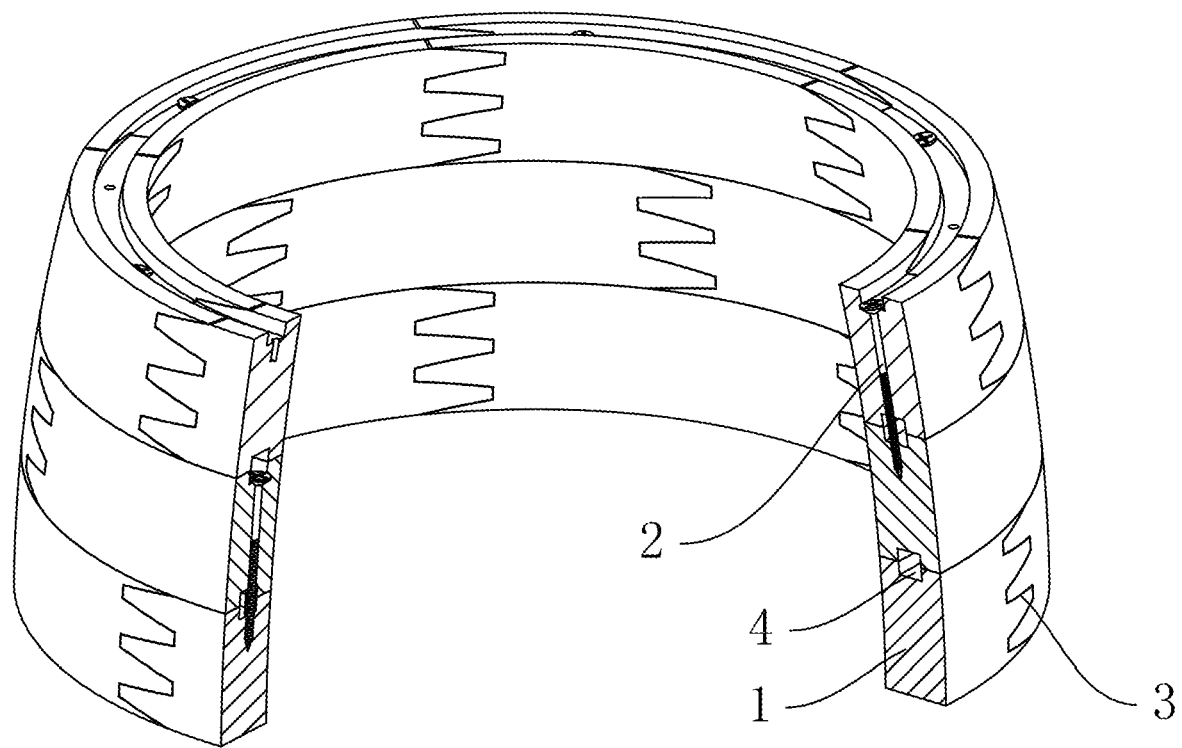
FIG. 5 is a perspective structural view of the first variation of the present invention.

The engagement teeth 3 on the left side of a pure wood unit are engaged with the engagement teeth 3 on the right side of a corresponding adjacent pure wood unit. Vertical connection between an upper pure wood unit and a lower pure wood unit can be achieved by the method described earlier. Therefore, each of the pure wood units 1 is likewise having the left side thereof connected with the right side of a corresponding adjacent pure wood unit, and thus forming a pure wood workpiece having an arc shape, as shown in FIG. 5.

Figure 6:
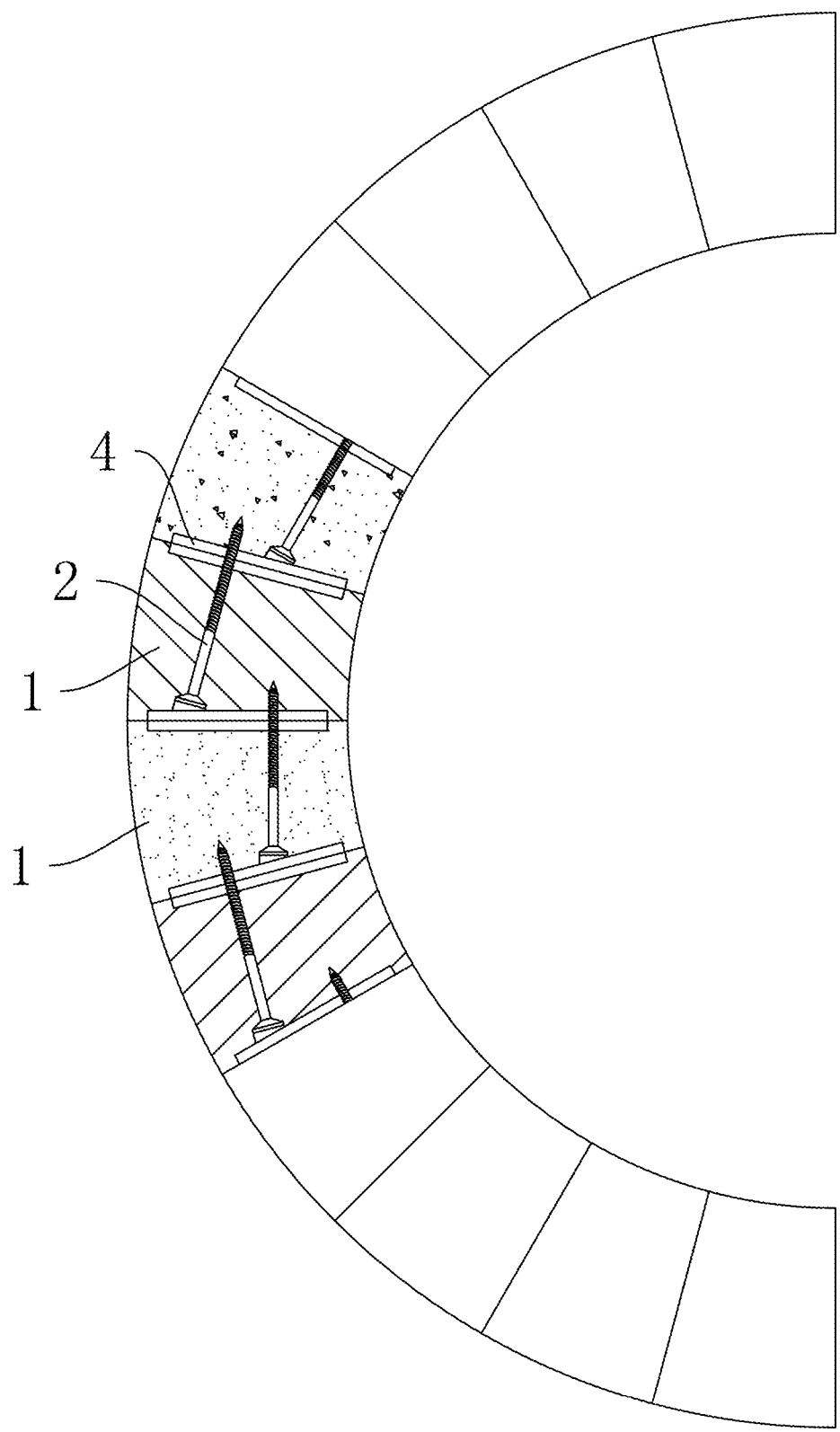
FIG. 6 is a top plan view partially sectioned to show the internal structure according to a second variation of the present invention.

Besides, according to practical need in different circumstances, the self tapping screws 2 can also be arranged in the pure wood units 1 as shown in FIG. 6, namely, the self tapping screws 2 may be screwed in a lateral direction of the pure wood units 1, so that the pure wood units 1 are mutually secured.

Figure 7:
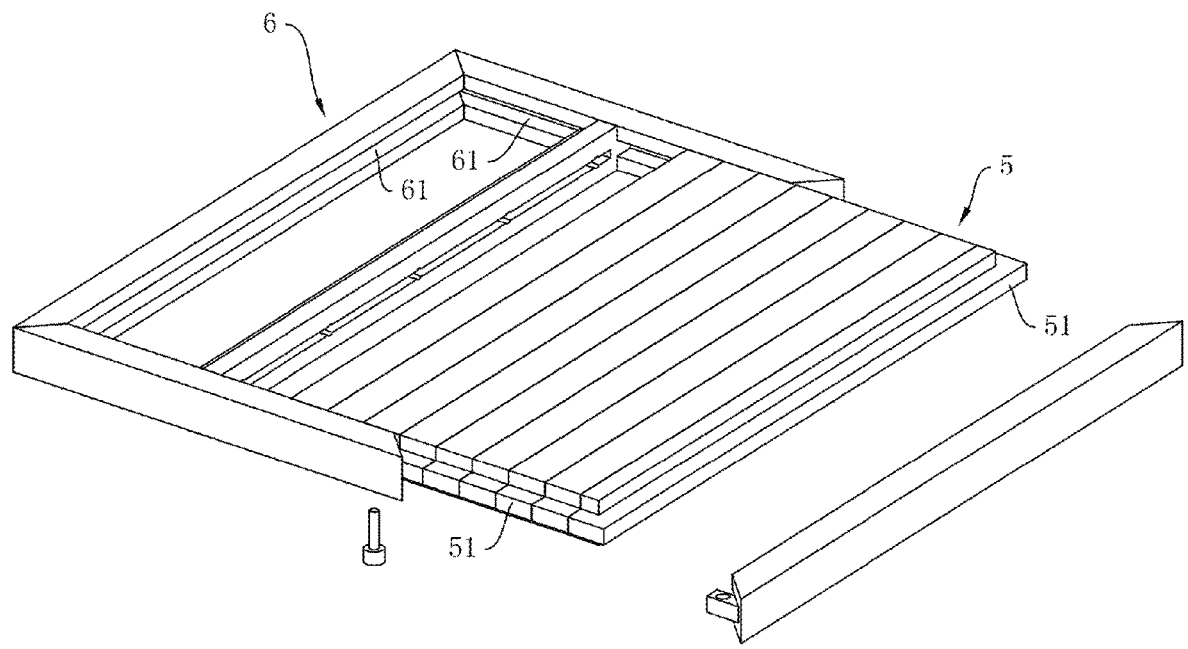
FIG. 7 is a partially exploded structural view according to a third variation of the present invention.

On the basis of the above disclosure, the use of the board structure 5 is further broadened as shown in FIG. 7, where a pure wood frame 6 is also provided; insertion edges 51 are provided on four sides of the board structure 5; insertion slots 61 are corresponding provided on four inner sides of the pure wood frame 6; the insertion edges 51 of the board structure 5 are inserted into the insertion slots 61 of the pure wood frame 6, so that the board structure 5 is assembled in the pure wood frame 6. The four sides of the board structure 5 are limited by the above structural design so that the four sides of the board structure are maintained to be flat and straight and the board structure 5 will no longer bulge and deform. The board structure accordingly has good active tensile ability and so completely prevents cracks and deformation. The entire board structure is more stable and has better structural strength, and thus having better quality that significantly increases its service life. Besides, the properties of solid pure wood are completely preserved in the entire board structure. Consumers' demands for solid pure wood products in terms of for example their greenness and environmental friendliness are effectively satisfied.

Figure 8:
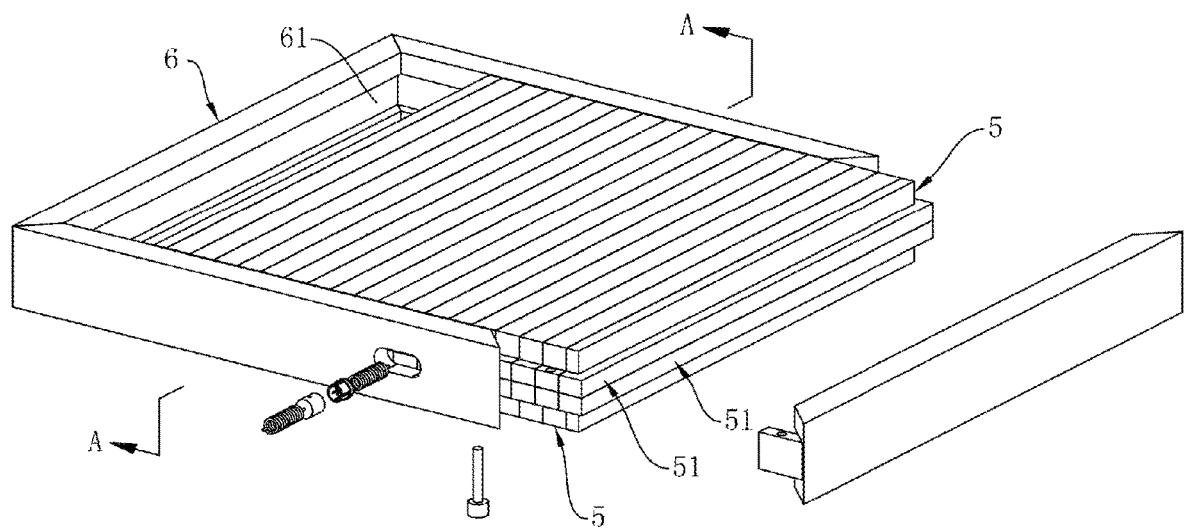
FIG. 8 is a partially exploded structural view according to a fourth variation of the present invention.
Figure 9:
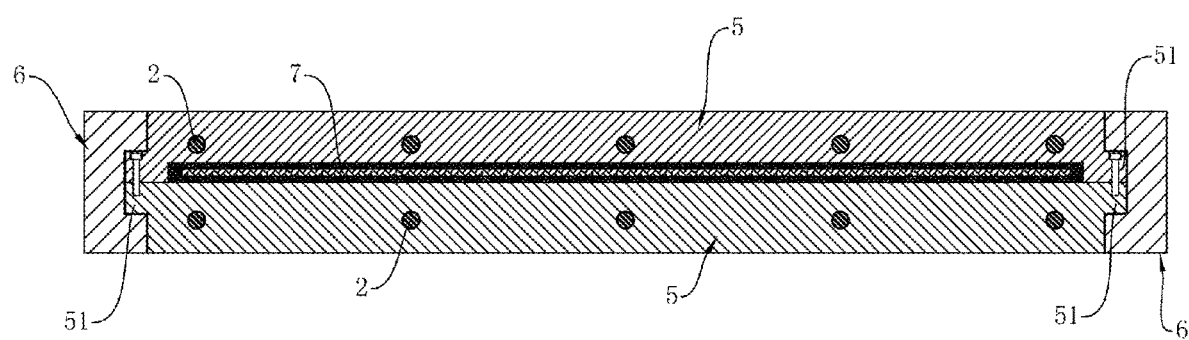
FIG. 9 is a sectional view along A-A of FIG. 8.
Figure 10:
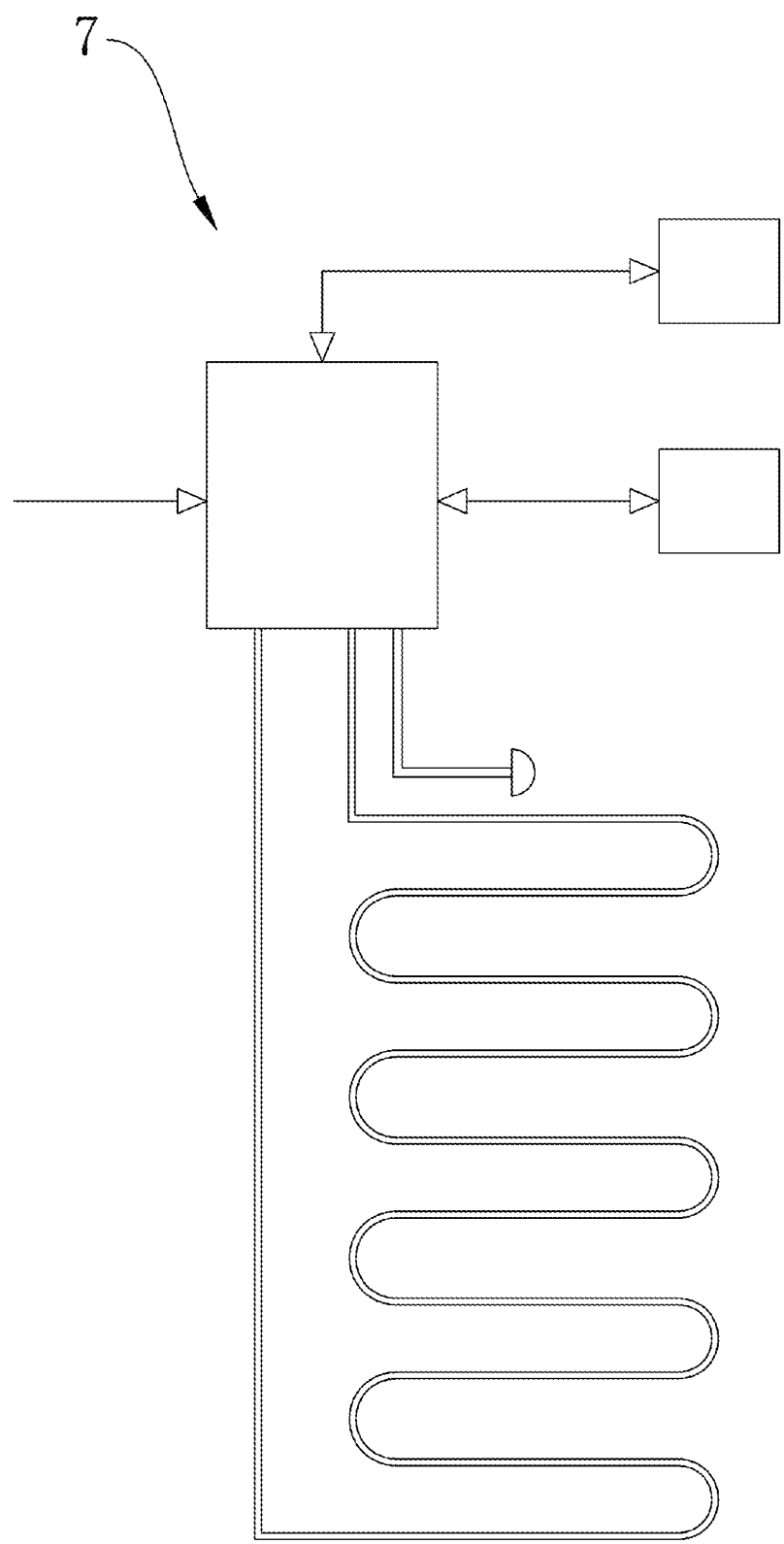
FIG. 10 is a schematic concept diagram of an electric heating element of the present invention.
Figure 11:
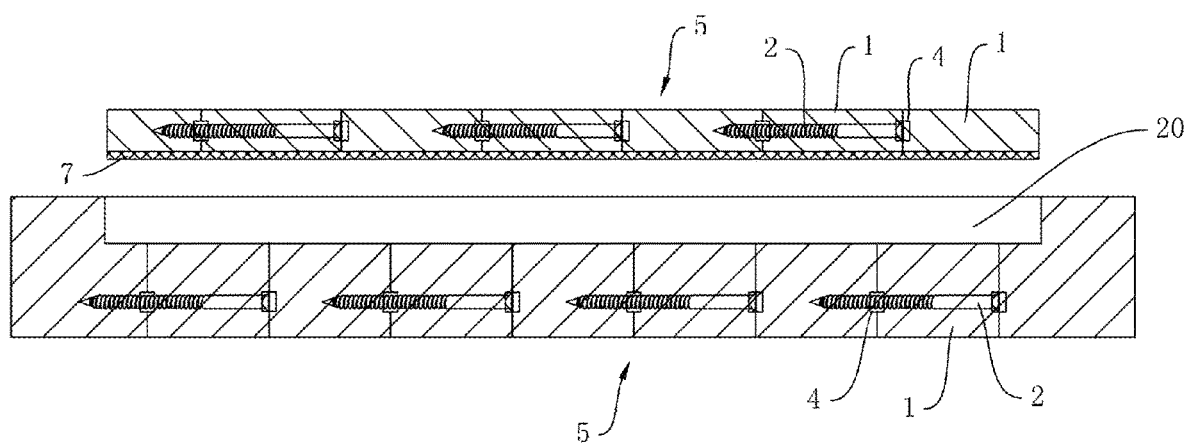
FIG. 11 is a sectional view showing the structure according a fifth variation of the present invention.

On the basis of the teachings of the pure wood frame 6 and the board structure 5 as disclosed above, the scope of application of the present invention can be further broadened by using two pieces of board structure 5, as shown in FIGS. 8-9. An electric heating element 7 is provided between the two pieces of board structure 5; correspondingly, the pure wood frame 6 has an increased size so that two pieces of board structure 5 can be embedded in the pure wood frame 6. In order that the two pieces of board structure 5 are more tightly combined, a trough 20 is also provided between the two pieces of board structure 5; the electric heating element 7 is mounted in the trough 20.

Figure 12:
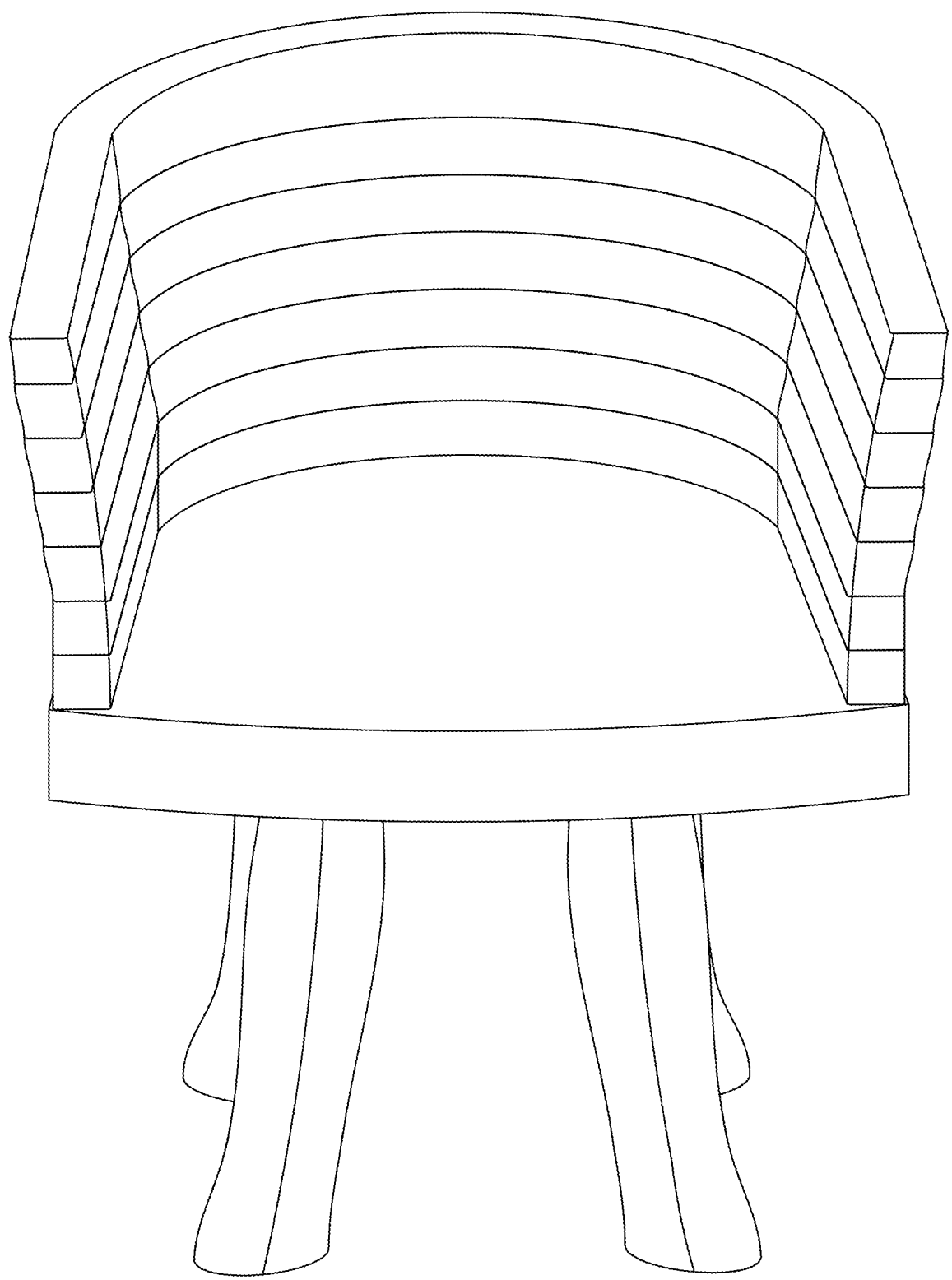
FIGS. 12 and 13 show a chair product made according to the present invention.
Figure 13:
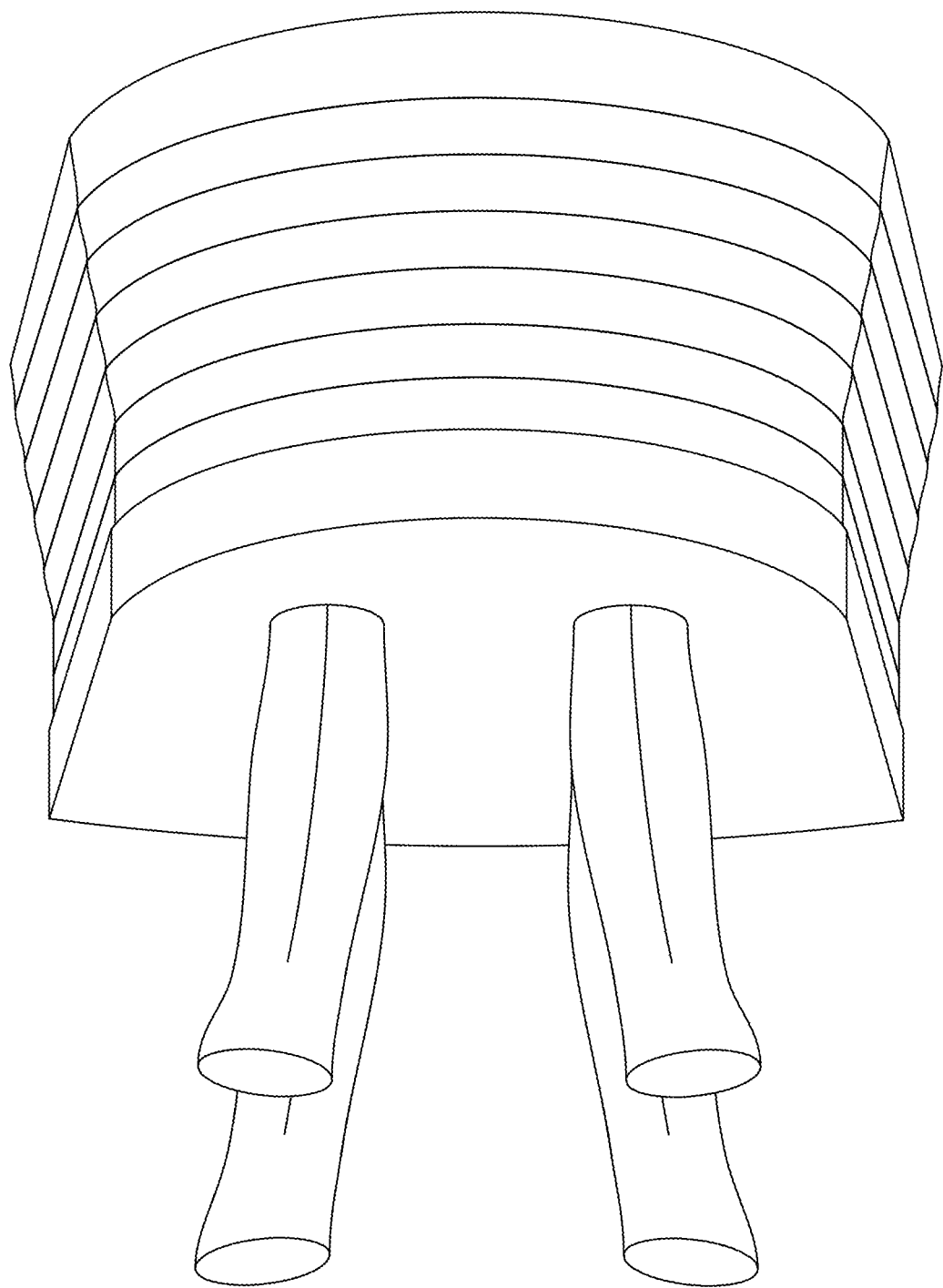

The electric heating element 7 mounted between the two pieces of board structure 5 achieves the function of heated board; the use of pure wood frame 6 is used for limiting and locking the two pieces of board structure 5. Therefore, an electrically heated pure wood board structure is attained, which effectively utilizes the active tensile ability of the board structure 5 to achieve the advantages such as stable and strong structure, and resistant to cracks and deformation. More importantly, the entire electrically heated pure wood board structure is ensured to be made completely by solid pure wood; the electric heating element is completely free of any metal parts and will not be visible from the outer appearance of the board structure. What is visible is only the solid pure wood board structure. Moreover, light weight and low cost facilitate processing and shaping into different specifications to be applied to different solid pore wood products. The adaptability and shaping of the present invention have no difference compared with conventional solid pure wood boards. However, the present invention has a wider applicability and effectively overcomes the problems of a conventional solid pure wood board such as easy deformation and cracking. As shown in FIGS. 12-13, the present invention is applied to the making of a chair where the chair may be shaped with more complicated curves and curved surfaces.

What is claimed is:

1. A connection structure formed by connecting pure wood materials, comprising a plurality of pure wood units, and a plurality of self-tapping screws; an upper side and a lower side of each of the pure wood units are provided respectively with a contraction slit; the upper side and the lower side of each of the pure wood units respectively possessed with the contraction slit are applied with wood adhesives;

in each one of the pure wood units, the self-tapping screws are screwed into the pure wood unit from the contraction slit on the upper side, through the contraction slit on the lower side, and down into the upper side of a corresponding adjacent pure wood unit of the pure wood units, so that the upper side of each of the pure wood unit is connected with the lower side of a corresponding adjacent pure wood unit; all the pure wood units are likewise mutually connected one adjacent to another to form a first board structure;

the connection structure also comprises a first pure wood board structure upper end closure unit and a second pure wood board structure lower end closure unit;

the wood adhesives are also applied to the first pure wood board structure upper end closure unit and the second pure wood board structure lower end closure unit; the first pure wood board structure upper end closure unit and the second pure wood board structure lower end closure unit are connected respectively to an upper outermost side and a lower outermost side of the first board structure; and then a clamp is used for clamping and pressing the first board structure.

2. The connection structure as in claim 1, wherein the pure wood units are processed to have arc shapes; each of the pure wood units is provided with engagement teeth on a first side and on a second side thereof to engage with respective adjacent pure wood units; the wood adhesives are applied to each of the engagement teeth;

the engagement teeth on the first side of each of the pure wood units are engaged with the engagement teeth on the second side of a corresponding adjacent pure wood unit; all the pure wood units are likewise having the first sides thereof connected with the second sides of the respective corresponding adjacent pure wood units.

3. The connection structure as in claim 1, wherein a pure wood frame is also provided; the first board structure is provided at four sides thereof with insertion edges; the pure wood frame is provided on four inner sides thereof with insertion slots corresponding to the insertion edges; the insertion edges of the first board structure are inserted into the insertion slots of the pure wood frame, so that the first board structure is assembled in the pure wood frame.

4. The connection structure as in claim 1, further comprising a second board structure; and an electric heating element is provided between the first board structure and the second board structure.

5. The connection structure as in claim 4, further comprising a trough the first board structure and the second board structure; whereby the electric heating element is mounted in the trough.

6. The connection structure as in claim 4, wherein the electric heating element is an electric heating film or electric heating wire or electric heating band.

\* \* \* \* \*